United States Patent [19]

Corompt

[11] Patent Number: 4,826,386
[45] Date of Patent: May 2, 1989

[54] DEVICE FOR MULTI-DIRECTIONAL TIPPING OF A SKIP OR CONTAINER CARRIED BY A VEHICLE

[75] Inventor: Antoine Corompt, Rue Bergson, France

[73] Assignee: Bennes Marrel, France

[21] Appl. No.: 681,913

[22] Filed: Dec. 14, 1984

[30] Foreign Application Priority Data

Dec. 14, 1983 [FR] France ............... 83 20417

[51] Int. Cl.⁴ ........................... B60P 1/34
[52] U.S. Cl. ................... 414/421; 414/498; 298/18; 298/17.7
[58] Field of Search .......... 414/498, 546, 607, 421; 298/1 A, 17.6, 17.7, 18

[56] References Cited

U.S. PATENT DOCUMENTS

| | | | |
|---|---|---|---|
| 2,360,456 | 10/1944 | Weierbach | 298/17.6 |
| 3,292,804 | 12/1966 | Veneman | 414/607 X |
| 3,964,791 | 6/1976 | Griffis | 298/17.6 X |
| 4,132,325 | 1/1979 | Corompt | . |

FOREIGN PATENT DOCUMENTS 2397303  3/1979  France ........................ 414/498

*Primary Examiner*—Frank E. Werner
*Attorney, Agent, or Firm*—Remy J. VanOphem

[57] ABSTRACT

A lorry fitted with a known system which allows it to handle a container in order to load it, to unload it onto the ground, or to tilt it towards the rear to accomplish a tipping operation. A platform of a detachable cradle has a jack which operates a tipping chassis. A longitudinal pivot shaft of the tipping chassis is mounted at the side of the cradle, which permits lateral tipping of the container. Another jack, and the alternative fitting of one or the other of two longitudinal pivot shafts, permits selective tipping to the right or left side of the lorry as desired.

12 Claims, 5 Drawing Sheets

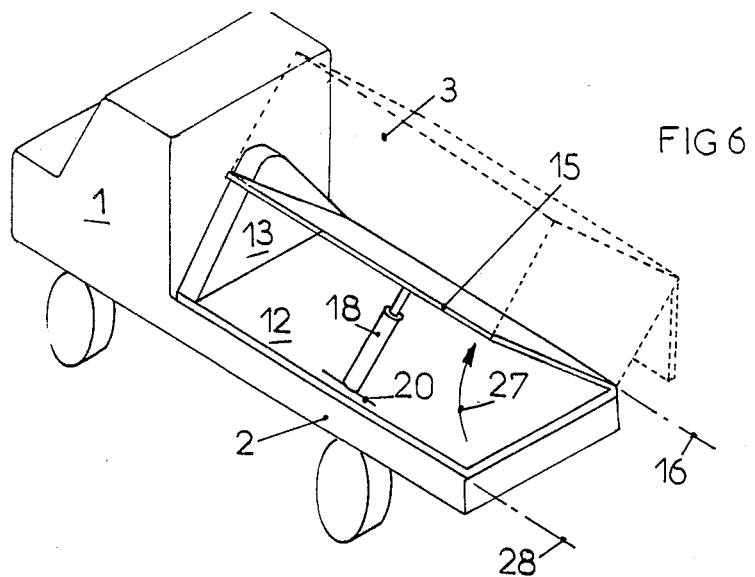
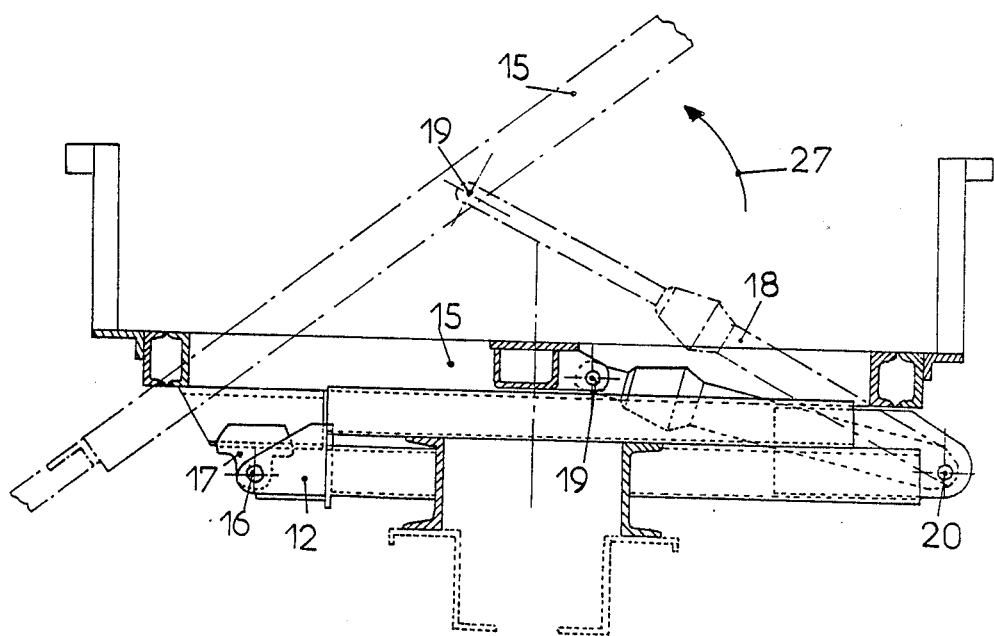

DEVICE FOR MULTI-DIRECTIONAL TIPPING OF A SKIP OR CONTAINER CARRIED BY A VEHICLE

BACKGROUND OF THE INVENTION

1. Field of the Invention

The present invention concerns a multi-directional tipping device which is intended to be fitted to a skip or a container manipulated by a vehicle. In particular, it concerns a lorry whose configuration allows it to carry a container, to place it on the ground or, alternatively, to lift if from the ground and automatically take it as a load. In addition, the container is able to be used on the lorry as a tipping skip.

2. Description of the Prior Art

An example of a device which allows a single lorry to manipulate a stock of several skips, cases, or containers is disclosed in French Pat. No. 2,185,520, corresponding to U.S. Pat. No. 3,878,948. This system, generally known under the commercial name "Ampliroll", has the advantage of grouping the majority of the costly components, mainly the hydraulic lifting circuits, on the lorry, which thereby reduces the cost of the containers handled by the lorry.

However, it has been found that this system has the disadvantage of permitting the container or similar device to be tipped only in a single direction, that is, towards the rear of the lorry. In particular, prior art designs do not allow the container to be selectively tipped to either side of the vehicle.

In order to carry out the operation of lateral tipping, it is known to utilize a device, such as that known under the commercial name "Tribenne", which includes a telescopic jack arranged vertically below the central part of the bottom of the skip. This system has the disadvantage of requiring special equipment on the lorry which, as a result, can only be used in this single way.

The present invention is intended to avoid these disadvantages by achieving a removable independent device which is able to be used by a standard type of Ampliroll lorry and which, moreover, remains available for other normal operations without requiring any structural modification.

SUMMARY OF THE INVENTION

A device according to the present invention for tipping a container which is intended to be carried in a known manner on a vehicle fitted with a built-in mechanism, which allows it to load, to unload, or to raise the container by tipping, includes a detachable cradle. The device is characterized in that the cradle carries on top of its platform a tipping chassis to which it is connected by at least one longitudinal and lateral pivot shaft. At least one tipping jack is mounted between the platform of the cradle and the tipping chassis above it and, finally, a locking mechanism is provided on the tipping chassis to secure the body of a skip or container to the tipping chassis.

According to another feature of the present invention, the tipping jack is constructed with hydraulic pipes having quick-disconnect fittings at the ends thereof which permit instantaneous connection to or disconnection from the hydraulic circuit of the vehicle when the cradle is placed thereon.

According to still another feature of the present invention, the lateral, longitudinal pivot shaft connecting the tipping chassis to the base platform of the cradle is detachably mounted so that it may be fitted, as required, to either of the two longitudinal sides of the cradle platform.

According to yet another feature of the present invention, two hydraulic tipping jacks are arranged side by side transversely in relation to the longitudinal direction of the lorry. The hydraulic tipping jacks are fitted so as to lie in opposing directions between the lower platform of the cradle and the tipping chassis about it. Thus, by operating one or the other of the two jacks, according to the side of the cradle on which the lateral, longitudinal pivot shaft has been fitted, it is possible to tip the skip towards the right or the left side of the vehicle.

The attached drawings, given by way of non-limiting example, will allow the characteristics of the invention to be better understood.

BRIEF DESCRIPTION OF THE DRAWINGS

FIG. 6 illustrates the maneuvre of tipping laterally;

FIG. 9 is a transverse sectional view, along line IX—IX of FIG. 8 rotated one hundred and eighty degrees.

DETAILED DESCRIPTION OF THE PREFERRED EMBODIMENT

Figure 1:
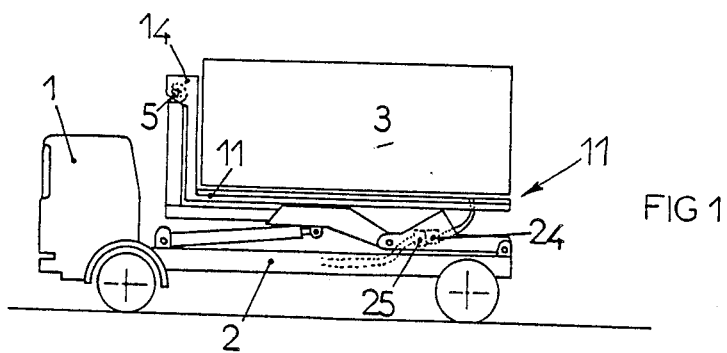
FIGS. 1 to 4 illustrate the successive phases for placement of a container fitted according to the present invention, which is to be carried by a lorry, on the ground.
Figure 2:
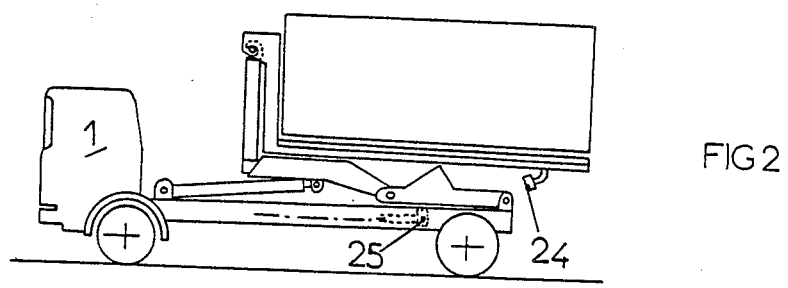
Figure 3:
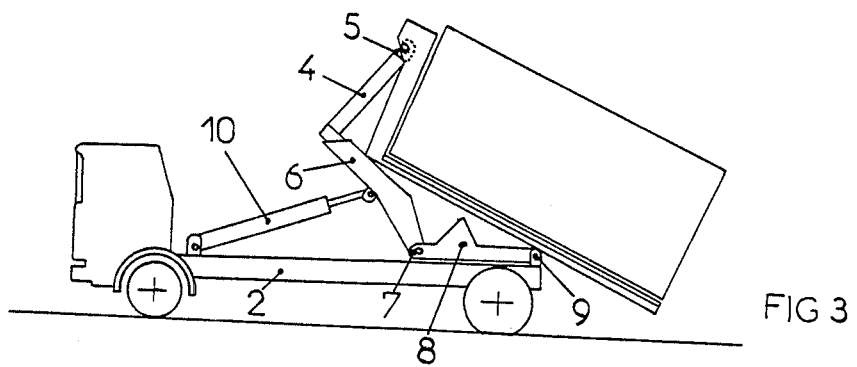
Figure 4:
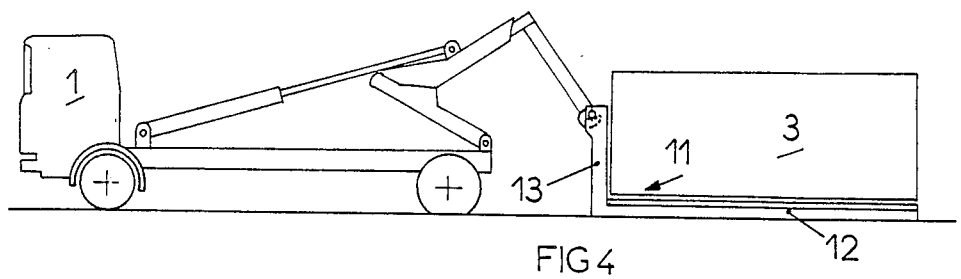

As illustrated in the drawings, a lorry 1 includes a chassis 2 which is fitted with a device known under the commercial name of Ampliroll, in order to allow the chassis to handle, change, or place on the ground the body of a skip or container 3. The Ampliroll mechanism includes in the known way a telescopic derrick 4 which is fitted with a lifting hook 5; an elevating arm 6, in which a horizontal branch of the telescopic derrick 4 can slide; a transverse shaft 7, pivotally mounting the rear of the elevating arm 6 to the front of an elevating link 8, a rear transverse shaft 9 which permits the rear of the elevating link 8 to pivot on the rear of the chassis 2; at least one lifting jack 10 pivoted between the front of the chassis 2 and the elevating arm 6; and a horizontal slide jack, not shown, located within the elevating arm 6, to horizontally control the extension of the telescopic derrick 4, as illustrated in FIGS. 1 and 2.

As designated by the reference numerals 1 through 10, the lorry so equipped constitutes a standard known vehicle.

Figure 7:
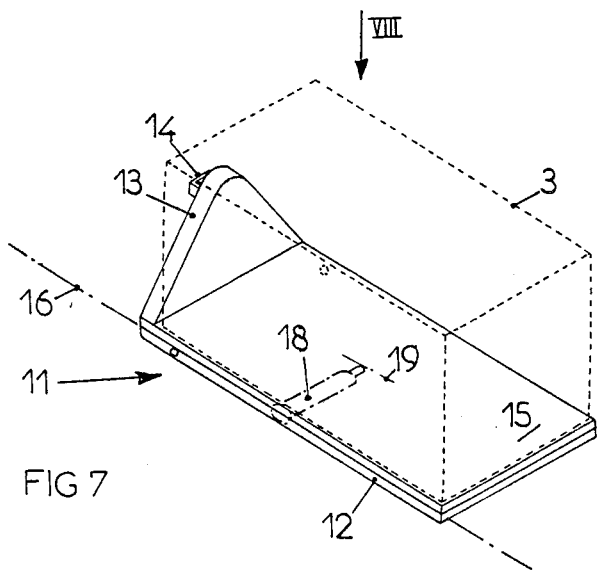
FIG. 7 is a diagrammatic view of the device according to the present invention.

The device according to the present invention is constituted by a detachable cradle 11, as shown in FIG. 7, which includes a lower platform 12, fixed at the front to a vertical panel 13 which has at its top an attachment shackle 14. The attachment shackle 14 is adapted to receive the lifting hook 5 carried by the lorry 1.

A tipping chassis 15 is placed on the lower platform 12 of the cradle 11 and is interconnected by a lateral longitudinal pivot shaft 16. In the example illustrated in FIG. 7 of the drawings, the longitudinal pivot shaft is located on the left side of the vehicle and is constructed of a plurality of spindles, not shown, which are aligned longitudinally in order to permit pivoting on the platform 12. One skilled in the art will clearly understand that the location of the longitudinal pivot shaft 16 can be elected to be on either side of the vehicle depending on the desired direction one wishes to pivot the tipping chassis 15. Yokes 17 are provided on the lower part of the tipping chassis 15 for positioning the longitudinal pivot shaft 16.

Finally, a transverse jack 18 is placed under the central part of the tipping chassis 15 to link a central shaft 19 on the lower part of the tipping chasis to a pivot shaft 20 located longitudinally on the right side of the platform 12.

In addition, the transverse jack 18 is fitted with two hydraulic control pipes 21 and 22. One end each of the hydraulic control pipes 21 and 22 is provided with quick-disconnect fittings 23 and 24, respectively. The quick-disconnect fittings 23 and 24 are designed to be easily connected to corresponding fittings 25 provided on the lorry 1, such as those shown in FIGS. 1 and 2. The fittings 25 of the lorry 1 are part of the hydraulic circuit of the vehicle which consists mainly of a hydraulic feed generator and a control distributor.

Figure 5:
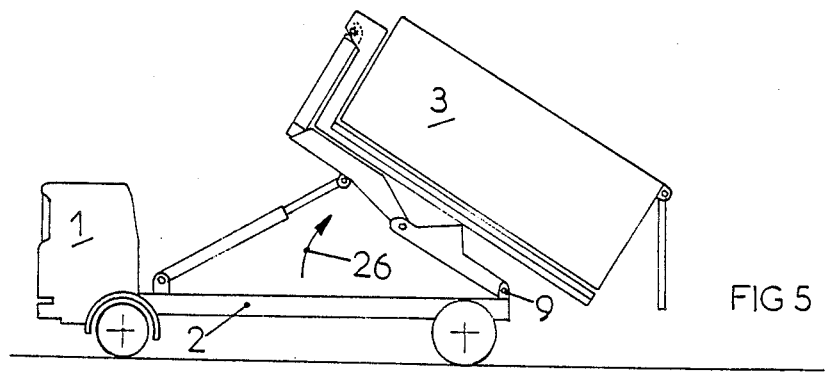
FIG. 5 illustrates the maneuvre for tipping towards the rear.

As long as the container 3 and the tipping chassis 15 remain level on the platform 12 of the cradle 11, as shown in FIG. 7, the platform 12 fitted with the container 3 can be manipulated by the lorry 1 in the normal manner of an Ampliroll container. The operation includes setting the container 3 down on the ground, as shown in the successive phases of FIGS. 1 through 4, and tipping operations towards the rear of the lorry 1, as illustrated in FIG. 5, whereby the container 3 is tipped around the rear transverse shaft 9, as indicated diagrammatically by the arrow 26.

Alternatively, when the container 3 is in the transport position, and the hydraulic fittings 23 through 25 are connected together, an operator only has to activate the hydraulic distributor of the vehicle to control the extension or contraction of the transverse jack 18. When the extension of the transverse jack 18 is accomplished, the entire tipping chassis 15 and container 3 are raised by pivoting around the longitudinal pivot shaft 16 to achieve tipping towards one side of the vehicle, as indicated by arrow 27 in FIGS. 6 and 9.

Figure 10:
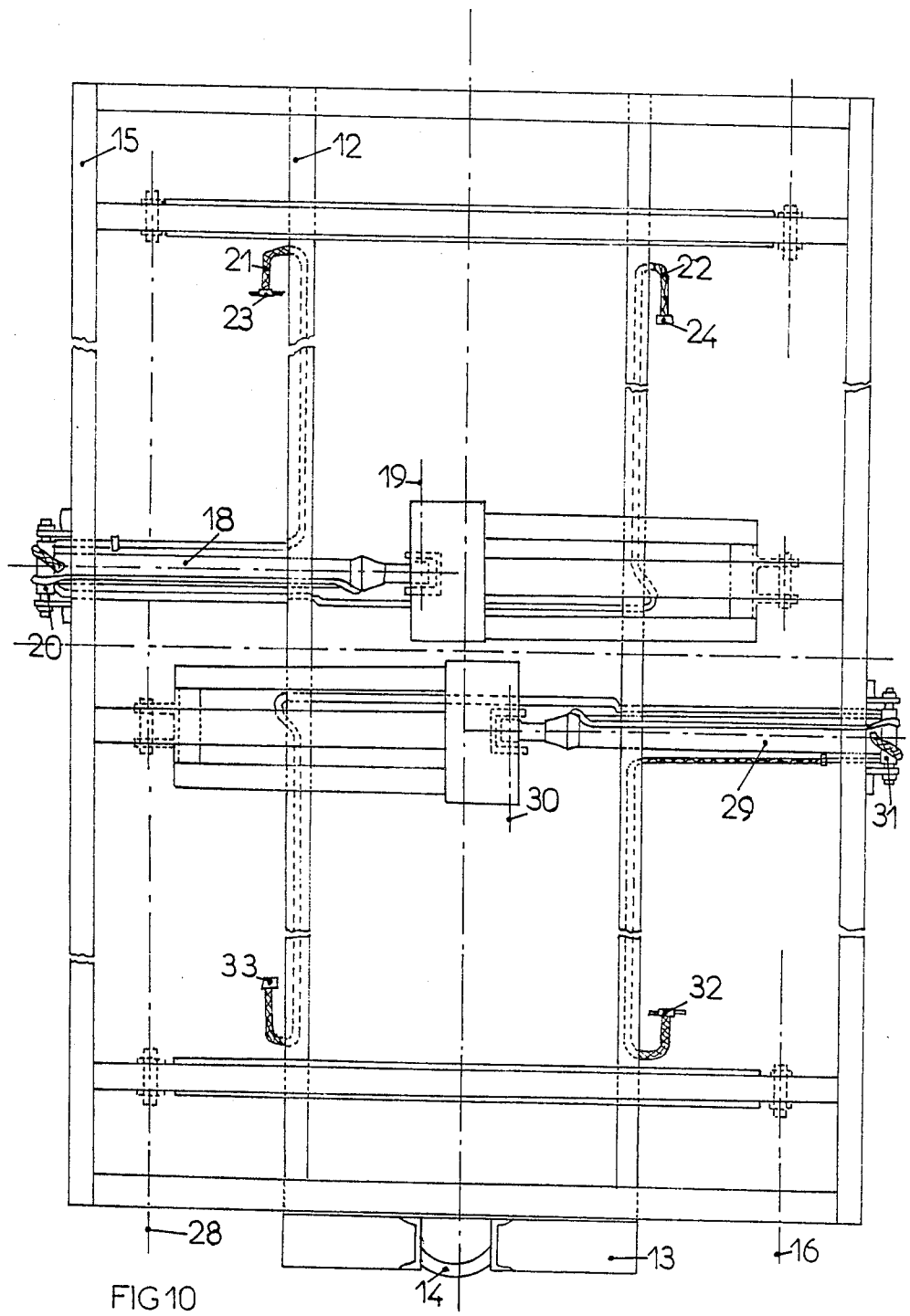
FIG. 10 illustrates an alternate embodiment of the device according to the present invention.

According to an alternate embodiment shown in FIG. 10, first and second jacks, such as 18 and 29, arranged in opposing directions, may be fitted side by side between the tipping chassis 15 and the platform 12. In other words, the first jack 18 would connect the central shaft 19 of the tipping chassis 15 to the pivot shaft 20 located on the one side of the platform 12, while the second jack 29 would connect a central shaft 30 on the tipping chassis 15 to a longitudinal pivot shaft 31 similar to the pivot shaft 20, but located on the other side of the platform 12. In addition, the longitudinal pivot shaft 16 may be detachably mounted along the one side of the platform 12, while another similar longitudinal pivot shaft 28 may be detachably mounted on the other side of the platform.

Thus, if the operator unlatches the longitudinal pivot shaft 28, on the other side of the platform 12, operation of the first jack 18 will allow tipping of the tipping chassis 15 towards the one side of the vehicle about the longitudinal pivot shaft 16.

If, on the other hand, the longitudinal pivot shaft 16 is unlatched and locates the longitudinal pivot shaft 28, operation of the second jack 29 will permit tipping of the tipping chassis 15 to the other side of the lorry.

Quick-disconnect fittings 32 and 33 are provided for connection of the second jack 29 to the lorry 1 in a manner similar to the quick-disconnect fittings 23 and 24.

Figure 8:
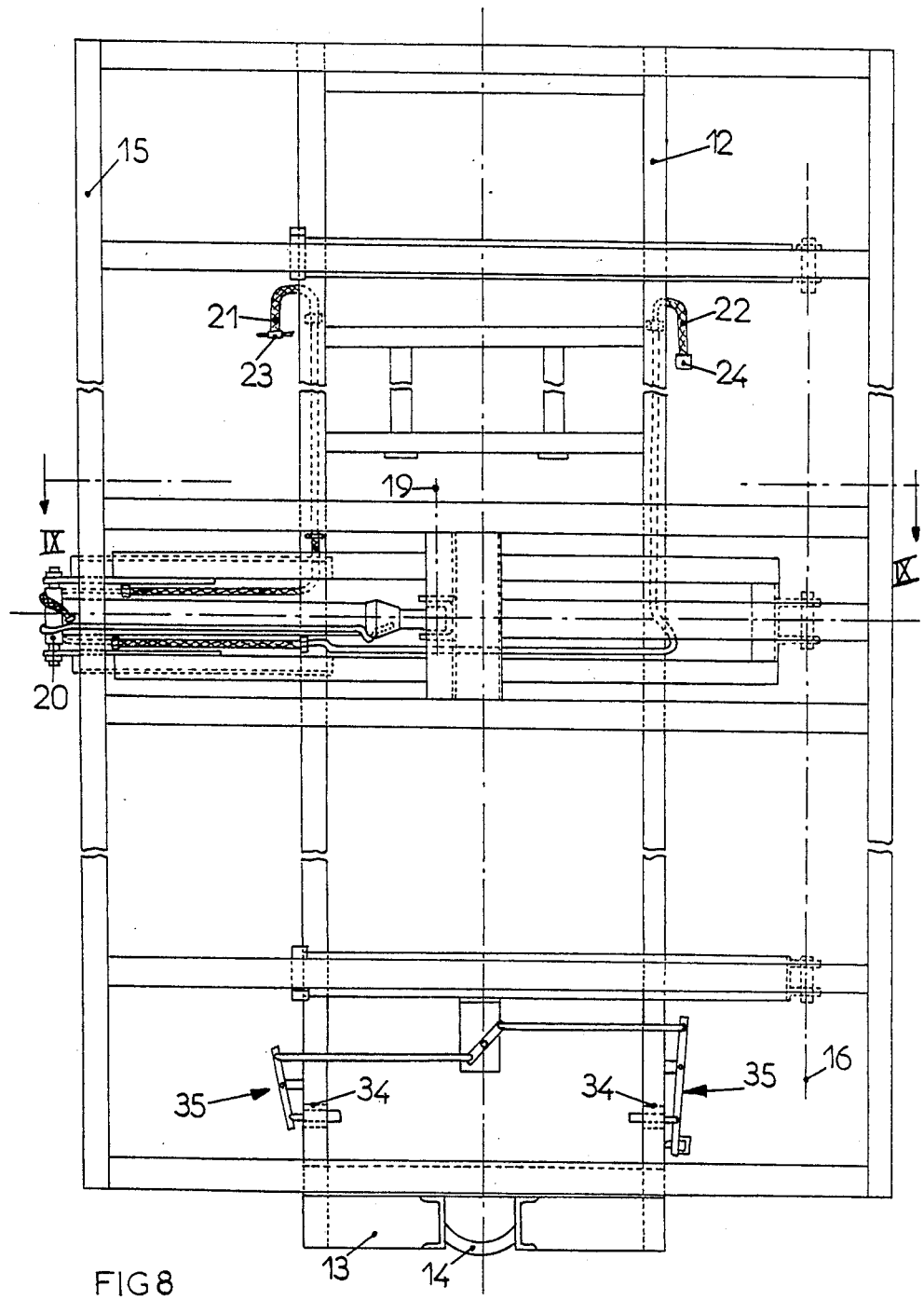
FIG. 8 is a plan view of the device of the present invention viewed in the direction of the arrow VIII of FIG. 7.

In addition, the platform 12 may be fitted at its front end with two lateral locations 34 which permit locking of the chassis 2 through a latching device 35 mounted on the chassis 2, as illustrated in FIG. 8.

The above description sets forth the best mode contemplated for carrying out the present invention. It will be apparent to those skilled in the art that many variations and modifications may be made thereto without departing from the spirit and scope of the claims appended hereto.

What is claimed is:

1. A tilting device intended to be used on a vehicle chassis for tilting a container loaded on said vehicle chassis, said tilting device comprising:
   a linkage means attached to said vehicle chassis, said linkage means having a lifting hook;
   a frame member having a lateral edge and an extended portion at one end thereof, said extended portion adapted to receive said lifting hook;
   first means for tilting said frame member in a longitudinal direction;
   a chassis member attached to said frame member; and
   second means for tilting said chassis member in at least one transverse direction such that said first means for tilting selectively tilts said frame member in a first longitudinal direction and said second means for tilting selectively tilts said chassis member in at least one transverse direction.

2. The device of claim 1 wherein said second means for tilting said chassis member in said at least one transverse direction further comprises:
   a predetermined number of yokes attached to said chassis member; and
   at least one pivot shaft located adjacent said lateral edge for cooperation therewith, said at least one pivot shaft further cooperating with said predetermined number of yokes to establish a pivot axis.

3. The device of claim 2 wherein said frame member further comprises a second lateral edge oppositely disposed from said lateral edge.

4. The device of claim 3 wherein said second means for tilting further comprises:
   a second predetermined number of yokes attached to an opposite side of said chassis member; and
   a second pivot shaft located adjacent said second lateral edge for cooperation therewith, said second pivot shaft further cooperating with said second predetermined number of yokes to establish a second pivot axis.

5. The device of claim 4 wherein said second means for tilting said chassis member in said at least one transverse direction comprises second hydraulic lift means transversely disposed with respect to said frame member, said second hydraulic lift means having one end attached to said frame member and an opposite end attached to said chassis member.

6. The device of claim 5 wherein said hydraulic lift means further comprises at least two hydraulic jacks.

7. The device of claim 6 wherein said hydraulic lift means further comprises a second hydraulic control pipe, said second hydraulic control pipe having one end attached to a respective one of said at least two hydraulic jacks and a second opposite end attached to said frame member, said second opposite end further having a quick-disconnect fitting.

8. The device of claim 7 further comprising second hydraulic actuation means having one end attached to said quick-disconnect fitting on said second opposite end of said second hydraulic control pipe, and an opposite end attached to said source of hydraulic liquid such that said second means for tilting said chassis member in said at least one transverse direction is operable from said vehicle.

9. The device of claim 1 wherein said second means for tilting said chassis member in said at least one transverse direction comprises hydraulic lift means transversely disposed with respect to said frame member, said hydraulic lift means having one end attached to said frame member and an opposite end attached to said chassis member.

10. The device of claim 9 wherein said hydraulic lift means further comprises at least one hydraulic jack.

11. The device of claim 10 wherein said hydraulic lift means further comprises at least one hydraulic control pipe having one end attached to said at least one hydraulic jack and a second opposite end attached to said frame member, said second opposite end further having a quick-disconnect fitting.

12. The device of claim 11 further comprising hydraulic actuation means having at least one end attached to said quick-disconnect fitting on said end of said at least one hydraulic control pipe, and an opposite end attached to a source of hydraulic liquid such that said second means for tilting said chassis member in said at least one transverse direction is operable from said vehicle.

* * * * *